Aug. 27, 1968     A. M. COMPTON     3,398,991
AUTOMATIC VEHICLE CONTROL SYSTEM
Filed Dec. 30, 1966
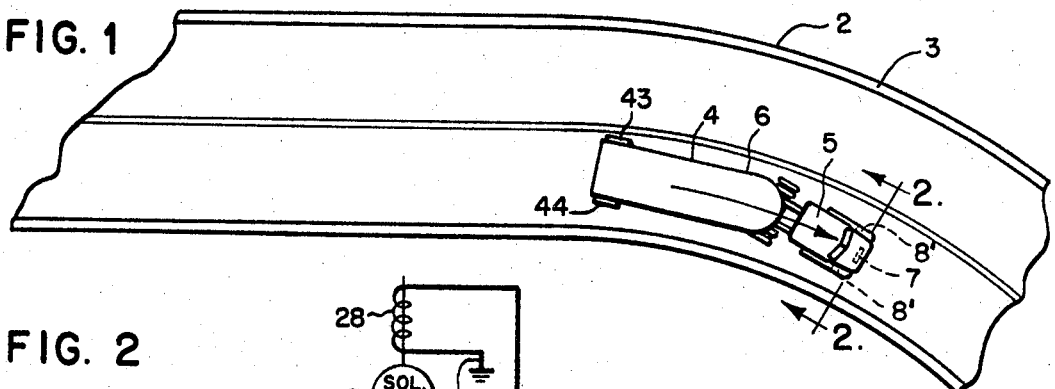
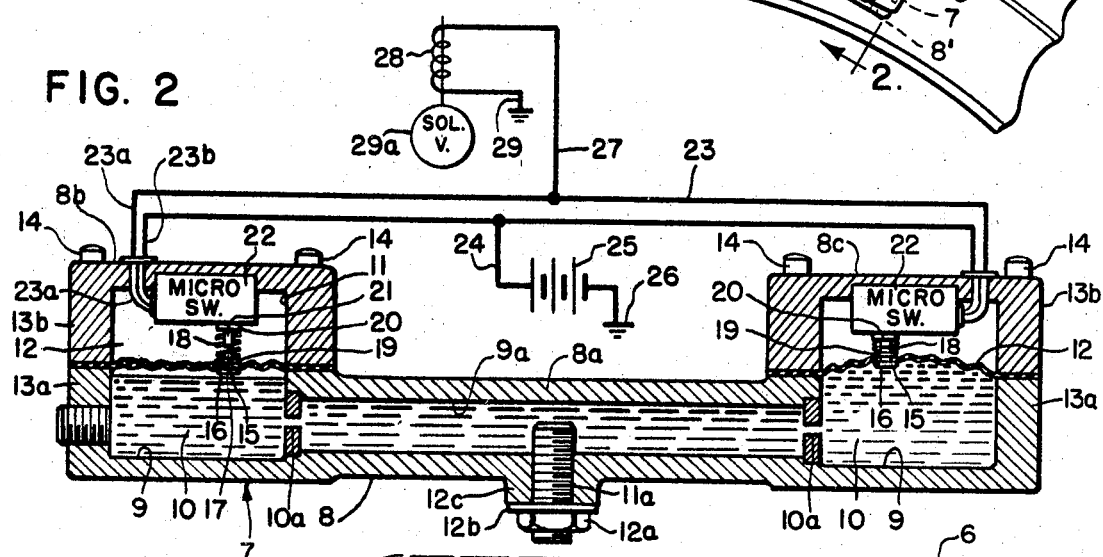
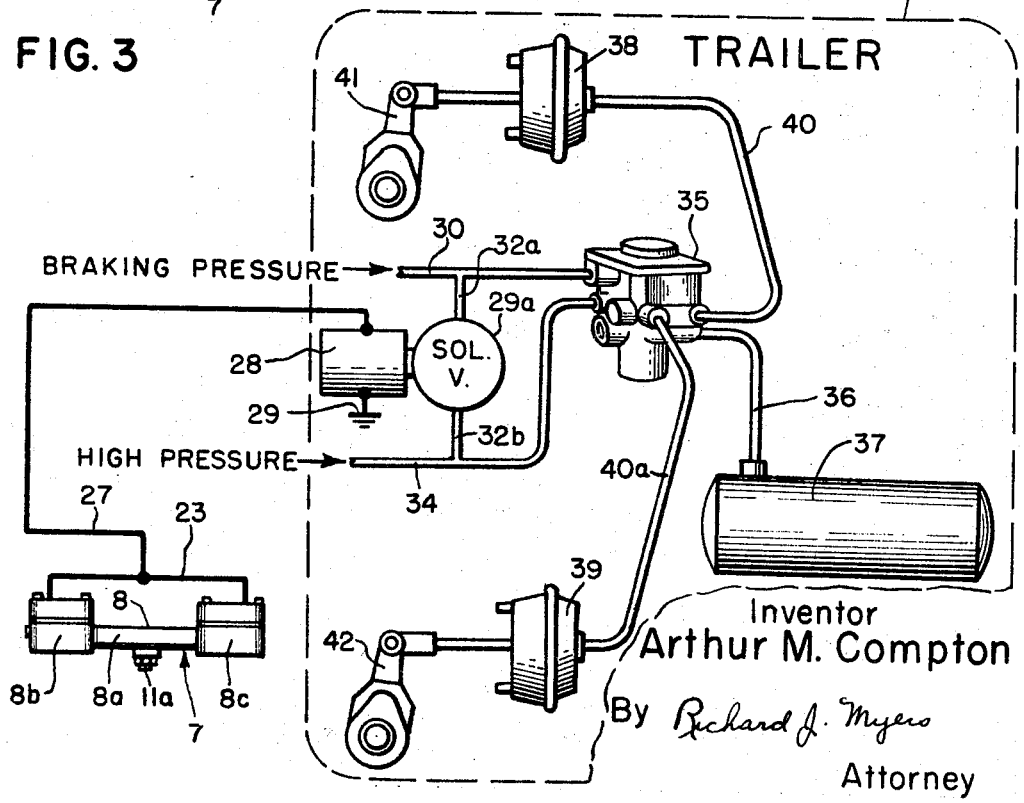
Inventor
Arthur M. Compton
By Richard J. Myers
Attorney United States Patent Office 3,398,991
Patented Aug. 27, 1968

3,398,991
AUTOMATIC VEHICLE CONTROL SYSTEM
Arthur M. Compton, Cincinnati, Ohio, assignor to Pullman Incorporated, Chicago, Ill., a corporation of Delaware
Filed Dec. 30, 1966, Ser. No. 606,341
10 Claims. (Cl. 303—7)

ABSTRACT OF THE DISCLOSURE

An automatic vehicle control system to prevent the vehicle from overturning by the provision of a centrifugal force responsive confined fluid medium placed or mounted transversely at the front of the vehicle and as low as possible which pressure responsive fluid at the danger point actuates a diaphragm controlled micro-switch sensor which in turn through the electrical control line operates a solenoid actuated air valve for applying air pressure to the brake chambers of a vehicle such as a trailer attached to a tractor for slowing down or stopping the vehicle should it make too fast a movement on a sharp turn.

(1) *Field of invention.*—This invention relates to an automatic vehicle control system and in particular relates to a device to prevent a vehicle from overturning on sharp curves should the vehicle be traveling too fast, such a vehicle anti-overturn device finding one application in highway trailers pulled by a tractor. The control of vehicles, such as trucks or tractors and their trailers, on highways and in cities and in congested areas is dependent upon the reaction of the operator, not the vehicle, and to mechanical devices on the vehicle under the driver's control. The reactions of the driver cannot be standardized as they are dependent upon many factors such as his health, etc. The dexterity of the operator is an important factor but it is important to eliminate as much as possible the burden of driving on the driver and, therefore, attempt to eliminate the human element, especially where the vehicle is moving at a high speed and a sudden turning movement of the steering wheel of the vehicle could result in overturning of that vehicle. Overturning or the tendency of overturning also could result from too fast an approach to, or passage around, a curve and dangerous conditions could thereby arise and, therefore, it is important to prevent such vehicle movements which could overturn the vehicle or create a dangerous highway condition.

(2) *Description of prior art.*—Many safety systems have been heretofore devised to prevent overturn of the vehicle upon a sudden turn of the vehicle from a straight line of travel but many of such systems have been too sluggish in their response to a dangerous condition such as passing around a curve or they have been too complicated and require too many components and should they break down or fail, their repair is expensive. In the interest of safety it is therefore desirable to provide a simply constructed and compact anti-overturn device which would prevent the vehicle from reacting in a dangerous condition on the highway should it be passing too quickly about or around a curve. It is preferable to locate such a device at the forward portion of the vehicle where the effects of the sharp curve are first detected. Also the device should be located in a position as low to the ground as possible where the effects of normal swaying motion are minimized.

Summary

This invention relates to an improved automatic vehicle control system and a particular structure to prevent overturn of the vehicle as it traverses around curves, particularly where such traversing is at too great a speed and the device is specifically adapted to not rely solely on the reflexes of the driver but is responsive to changes in centrifugal force as the vehicle, such as a truck or tractor, and its associated trailer pass around a sharp curve wherein the sensing device is located most forward of the vehicle and at the lowest point on the vehicle and is simple in construction and utilizing a minimum of parts and particularly employs a pressure responsive or centrifugal force responsive fluid medium which actuates an electrical means which in turn operates the vehicle braking system to apply braking action to appropriate axles of the associated trailer. More specifically, this invention includes provisions on the trailer and tractor vehicle whereby there is provided a sensitivity adjustable centrifugally responsive fluid entrapped within a container carrying a pressure diaphragm responsive adjustable and biased electrical switch means to operate a solenoid actuated valve for allowing increased air pressure to be sent to the brakes located in appropriate places on the trailer vehicle. It is a further object, advantage and purpose of this invention to mount the centrifugal force responsive device transversely at the front of the vehicle and as low as possible to be more immediately responsive. These and other objects, advantages and purposes will become apparent from a reference to the following description and drawings and appended claims.

Brief description of the drawings

FIG. 1 is a diagrammatic view of a vehicle, such as a tractor and its associated trailer passing about a curve;

FIG. 2 is a section of the vehicle showing the centrifugal force responsive means of the invention as taken along line 2—2 of FIG. 1 at the lower front part of the tractor; and FIG. 3 is a diagrammatic view of the centrifugal responsive device including an electrical and hydraulic means associated therewith for operation of braking action to the vehicle.

Description of the preferred embodiment

With reference to the drawings now, there is shown, as seen in FIG. 1, a highway 2 having a curved portion 3 and a tractor-drawn trailer vehicle 4 having a tractor 5 and a trailer 6. It is to be noted that, as shown in FIG. 2, there is provided a centrifugal force sensing device 7 located at the front end of the tractor 5 and mounted transversely on the tractor and as low as possible to give a true and proper and immediate measurement and determination and response of centrifugal force as best determined at the front wheels 8', 8' of the tractor 5. The centrifugal force responsive device 7 is also mounted centrally so that one-half of it extends over to the left side and the other half extends toward the right side of the tractor 5. The centrifugal device 7 comprises a housing 8 having a central narrow portion 8a and opposed enlarged housing portions 8b and 8c, one on each side of the vehicle. Each housing 8a or 8b defines a reservoir portion 9 containing a fluid or liquid 10 and a second chamber 11 separated from the chamber 9 by a flexible diaphragm 12, the chamber 11 containing air. The diaphragm is held between upper and lower sections 13a and 13b of the housing portion 8b by means of bolts 14. A button unit 15 has its lower head portion 16 contained in the diaphragm 12 and has a contact portion 17 extending thereabove and surrounded by a spring 18 which engages its retainer 19 and retainer 20 of the micro-switch contact 21 mounted on the micro-switch electrical mechanism 22 having leads 23a and 23b leading from the micro-switch 22 and connecting with leads 24 to a battery 25 and ground 26 and also to lead 27 and a solenoid or induction coil 28 and solenoid valve 29a and its ground 29. It will be noted that leads 23b and 23c communicate with each micro-switch 22 of the respective housing 8b or 8c on each side of the cab 5. As seen in FIG. 3, the solenoid unit 28 operates the solenoid valve 29a to allow high pressure to go into the braking pressure line 30 by opening up the lines 32a and 32b with the high pressure line 34 whereby pressure is delivered to the emergency valve 35 which has a line 36 communicating with reservoir 37 whereby brake chambers 38 and 39 are fed by brake lines 40 and 40a to operate the suitable slack adjuster and associated braking mechanism 41 and 42, such being of standard trailer brake design to operate selected trailer brakes (not shown) for the respective rear wheels 43 and 44 of the trailer 4. It will be noted that the centrifugal force responsive device has each of its chambers 9 communicating with a central chamber 9a as defined by the housing portion 8a, the chamber 9a containing fluid 10 which communicates through a restriction passageway 10a communicating with each right and left chamber 9, 9. The chamber 9a may be changed in volume also by the adjustable plunger 11a extending into the chamber 9a and having nut adjusting means 12a on the outside end thereof and washer 12b seating against embossment 12c of the lower portion of the housing 8a.

Thus it is seen that there is provided a vehicle control system in the form of an anti-overturn device for apparatus which comprises a centrifugal force responsive unit comprising a housing containing fluid reciprocable from one chamber into another through flow restricting means 10a and wherein each chamber is provided with a flexible diaphragm having an electrical contact engageable with another electrical contact of a micro-switch or the like, each of the contacts being biased apart from one another by the spring member 18 and wherein the micro-switch is provided with electrical leads connecting with a solenoid for actuating a valve to admit air under high pressure through an emergency valve to the brake chambers and associated braking components located on the trailer in order to stop the trailer upon the trailer-cab vehicle rounding a curve too quickly for conditions to the extent that the centrifugal force becomes great enough to cause the sensing mechanism to operate the braking system of the vehicle before vehicle over-turning can occur. The anti-overturn device to be sensitive to centrifugal force is mounted transversely at the front of the vehicle as low as possible, and as the vehicle enters a turn the fluid flows outwardly forcing the outer diaphragm upward toward the micro-switch sensor and as centrifugal force approaches the danger point the sensor actuates the solenoid valve means to apply brakes on selected axles. The flow restrictors 10a prevent the micro-switch sensor from operating indiscriminately and only upon such situations where dangerous or more definite or sharp curves are involved and will not be responsive to slight or minor sway effects that the trailer vehicle would ordinarily encounter on its way along the highway.

The volume adjustment screw 11a can control the amount of pressure and therefore the sensitivity of the fluid in response to centrifugal force and the strength of the spring 18 and the spacing of the contacts 19 and 20 provides the sensitivity control gap between the micro-switch 22 and the diaphragm 12.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:
1. An anti-overturn device for a vehicle responsive to centrifugal force acting on a vehicle comprising:
    a centrifugal force responsive device having a housing provided with a pair of chambers and a passage interconnecting said fluid receiving chambers,
    said passage having flow restriction means at each of its ends for restricting fluid communication with each of said chambers,
    each of said chambers having a fluid storing portion and a flexible diaphragm means where upon an increase of pressure of said fluid due to centrifugal force said diaphragm is moved,
    sensor means for each diaphragm means and having operative connection therewith,
    a sensor actuated vehicle brake actuating valve having operative connection with each of said sensor means,
    a vehicle brake means operatively connected with said valve and operative to brake said vehicle upon actuation of said sensor actuated valve, and
    said passage being provided with a volume adjusting means to control the volume of said chambers.
2. The invention according to claim 1, and
    said volume adjusting means comprising adjustable screw means.
3. An anti-overturn device for a trailer vehicle where the anti-overturn device is to be mounted at the fore part of the vehicle and as low as possible to be responsive to changes in centrifugal force imposed upon the vehicle when the vehicle is turning comprising:
    a centrifugal force responsive device having a housing including a pair of laterally spaced apart chambers, restricted flow passage means interconnecting each chamber at their one end and at their other end each being provided with a flexible fluid responsive diaphragm means,
    electrical switch means operated by movement of each of said diaphragm means and valve means for supplying the necessary air pressure to apply the vehicle brakes being in operative connection with said electrical switch means and operative thereby, and
    said passage means being provided with a volume adjusting means to control the volume of said chambers.
4. Automatic vehicle control means for a trailer vehicle having a forward tractor portion and a trailer portion whereby centrifugal force responsive means are mounted on the forward tractor at the lower forward portions thereof and brake means are mounted on the trailer portion, said centrifugal force responsive means comprising:
    a pair of interconnected fluid containing chambers responsive to changes in centrifugal force in the vehicle whereby one or the other of said chambers is affected by the centrifugal force,
    sensing means including diaphragm means responsive to movement of fluid in said chambers,
    valve means electrically operated in response to said sensor means, and
    a volume adjusting means connecting with the chambers to control the volume of said chambers.
5. An anti-overturn device for a mounting on the vehicle responsive to sideward sway of the vehicle, said anti-overturn device comprising,
    a pair of laterally disposed chambers,
    passage means interconnecting each chamber,
    diaphragm means in each chamber responsive to movement of fluid within said chamber,
    electrical contact means in the form of sensing means responsive to movements in said diaphragm,
    valve means responsive to electrical energization by said contact means to allow brake air pressure to apply brakes to the vehicle brake system for stopping the vehicle upon an increase in centrifugal force in one of said chambers,
    restrictive means in said passage for preventing flow of fluid in one chamber to the other chamber upon minor shifts in lateral forces imposed in the vehicle, and
    said passage being provided with volume adjusting means to determine the volume of said passage communicating with each of said chambers.

6. The invention according to claim 5, and
said valve means comprising a solenoid actuated valve that is normally closed and upon said electrical energization said valve is placed in the open position to allow communication of high air pressure to the air pressure brakes of the vehicle.

7. The invention according to claim 5, and
said volume adjusting means comprising adjustable screw means.

8. An anti-overturn device for a vehicle responsive to centrifugal force acting on a vehicle comprising:
a centrifugal force responsive device having a housing provided with a pair of chambers and a passage interconnecting with fluid receiving chambers,
said passage having flow restriction means at each of its ends for restricting fluid communication with each of said chambers,
each of said chambers having a fluid storing portion and a flexible diaphragm means where upon an increase of pressure of said fluid due to centrifugal force said diaphragm is moved,
sensor means for each diaphragm means and having operative connection therewith,
a sensor actuated vehicle brake actuating valve having operative connection with each of said sensor means, and
said passage being provided with a volume adjusting means to control the volume of said chambers.

9. The invention according to claim 8, and
said volume adjusting means comprising adjustable screw means.

10. An anti-overturn device for a vehicle responsive to centrifugal force acting on a vehicle comprising:
a centrifugal force responsive device having a housing provided with a pair of chambers and a passage interconnecting said fluid receiving chambers,
said passage having flow restriction means at each of its ends for restricting fluid communication with each of said chambers,
each of said chambers having a fluid storing portion and a flexible diaphragm means where upon an increase of pressure of said fluid due to centrifugal force said diaphragm is moved,
sensor means for each diaphragm means and having operative connection therewith,
a sensor actuated vehicle brake actuating valve having operative connection with each of said sensor means,
a vehicle brake means operatively connected with said valve and operative to brake said vehicle upon actuation of said sensor actuated valve,
said brake means comprising a source of compressed air,
brake chamber means being in operative communication with said source of compressed air,
said electrically actuated valve being in operative disposition between said source of compressed air and the brake chamber and adapted to supply air pressure to the brake drums to operate the brake arrangement in response to said action of said centrifugal force responsive device, and
said passage being provided with a volume adjusting means to control the volume of said chambers.

References Cited

UNITED STATES PATENTS

| | | | |
|---|---|---|---|
| 2,152,123 | 3/1939 | Williams | 188—152 |
| 2,588,424 | 3/1952 | Speaker | 200—61.47 |
| 3,035,869 | 5/1962 | Francia | 303—6 |
| 3,141,707 | 7/1964 | Nigh | 303—24 |

FOREIGN PATENTS

| | | |
|---|---|---|
| 727,034 | 3/1955 | Great Britain. |
| 848,228 | 9/1960 | Great Britain. |

MILTON BUCHLER, *Primary Examiner.*

J. J. McLAUGHLIN, *Assistant Examiner.*